United States Patent [19]

Sanne

[11] 4,203,470
[45] May 20, 1980

[54] SAFETY VALVE FOR GAS PIPES
[75] Inventor: Oddmund Sanne, Oslo, Norway
[73] Assignee: Sanne & Wendel A/S, Oslo, Norway
[21] Appl. No.: 927,437
[22] Filed: Jul. 24, 1978
[30] Foreign Application Priority Data
Aug. 5, 1977 [NO] Norway .................. 772763
[51] Int. Cl.² .............. F16K 11/02; F16K 25/00; F16K 39/00
[52] U.S. Cl. .............. 137/625.46; 251/161
[58] Field of Search .......... 137/625.46, 625.18, 137/625.42, 625.43; 251/161

[56] References Cited
U.S. PATENT DOCUMENTS

| | | | |
|---|---|---|---|
| 2,611,392 | 9/1952 | Johnson | 137/625.46 |
| 2,893,430 | 7/1959 | Holl | 137/625.46 X |
| 3,114,393 | 12/1963 | Vlasic | 137/625.46 X |
| 3,490,494 | 1/1970 | Cooper et al. | 137/625.46 |
| 3,964,517 | 6/1976 | Dickenson | 137/625.43 |

*Primary Examiner*—Arnold Rosenthal
*Attorney, Agent, or Firm*—Ladas, Parry, Von Gehr, Goldsmith & Deschamps

[57] ABSTRACT

A safety valve for gas pipes preventing backflow in the closed position is described. Simultaneously any possible leakage from the line is vented. The line to be closed terminates with two adjacent ends in a fixed plate having corresponding openings. Opposite the plate a rotatably mounted plate is arranged. This rotatable plate carries a 180° pipe bend the openings of which correspond with the respective openings in the fixed plate. Sealing means are arranged between the two plates, sealing around the line end openings in the closed as well as the open position of the 180° pipe bend.

4 Claims, 3 Drawing Figures

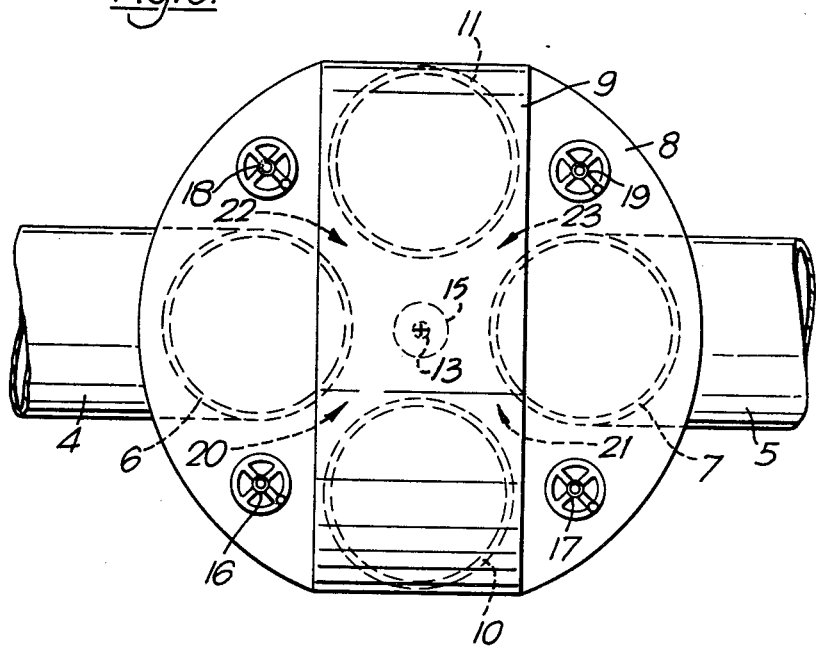

SAFETY VALVE FOR GAS PIPES

The invention pertains to a safety valve for gas pipes, especially in connection with inert gas plants on board tank ships, to obtain a total cut-off of the gas pipe with simultaneous closure of the pipe ends adjoining the cut-off, and the venting of any possible gas leakage from the said ends, which safety valve is of the type further described in the introduction to the following main claim.

The use of inert gas plants to transport inert gas to ships' tanks is normal these days as a preventive measure against explosions. In the pipe lines which connect the inert gas plant with the ships' tanks, said inert gas plant being located either as a separate plant or in the ship's engine room, there must be a safety valve or switch which is responsible for preventing the gas from the tank from leaking into the engine room and causing an explosion therein.

A variety of valves are in usage which are both complicated and somewhat time consuming to operate, and which all share in common the feature of not giving 100% cut-off in the line.

The intention of this invention is to provide a safety valve or safety switch of a very simple construction which is quick to operate, and which can be manually operated by a single person. Such a safety valve can thus be operated quite irrespective of possible emergency situations where the ship's power facilities may be of operation. When, moreover, the safety valve can be speedily operated, one is assured that it can be brought to the cut-off position, that is to say the closed position, as soon as the tanks are filled with inert gas and the inert gas plant is stopped.

The requirements to a safety valve for the above mentioned purposes must be as follows:
1. The safety valve should speedily give 100% cut-off in the gas pipes without the possibility of gas of relatively low pressure leaking between tank and engine room.
2. The cut-off place i.e. the pipe line's ends adjoining the safety valve, should be able to be closed by flanges or the like in the valves closed/cut-off position, with venting of any possible gas leakage.
3. The valve should be able to be manually operated.
4. The valve should be able to be speedily operated, e.g. shifting from open to closed position within 4 minutes, and vice versa, by a single person.
5. The valve, when rightly placed on board, should be observable from the bridge without helping aids to tell whether it is in the closed or open position.
6. The valve's purpose is to replace previously known "barriers" between engine room and ship's tanks, but it is not intended for replacing existing closing valves though it may supplement these.

The basic idea of the invention is to create a safety valve through which total cut-off in the pipe line is obtained as well as closing of the pipe ends at the cut-off, and where the safety valve is so constructed as to give a continuous venting of the area around the cut-off place for the pipe lines without any possibility of clogging and only with the help of air streams created by natural flow around the safety valve i.e., with the help of wind, or such wind as is created by the ship's motion. A very important feature is that the venting which secures the cut-off place against a leakage of gas from one end into the other, is independant of the ship's power sources. This will insure that inflammable gas from the tanks cannot reach the engine room, via the safety valve, and be ignited therein. Similarly by means of the said venting no sparks from an engine room fire will be able to be ignited in the gas concentration in, or about the cut-off place, since by means of the safety valve any possible gas leakage has already been vented away.

Valves similar to that given in the introduction are known from the prior art e.g. U.S. Pat. No. 3.964.517. In the valve following from the latter patent there is an open space between the closed pipe ends. Because the valve is assembled in a closed housing a possible gas leakage from one of the closed pipe ends could infiltrate the other closed pipe end should there be a flaw in the gaskets. It is precisely this infiltration of gas leakage from the one closed pipe end to the other closed pipe end which is sought to be prevented by the safety valve obtained from this invention. The valve obtained from the said U.S. Patent consists amidst other things of a plate which can be raised and lowered as well as rotated, and on which are assembled pipe legs such as are given in the introduction to this description. The said plate is positioned very close to the valve's housing, and should such a valve be used in combination with inert gas which is very acid, then the valve plate will rust insofar as the damp air to be found around the valve, together with the said inert gas, will lead to corrosion and rusting. Such a valve cannot therefore be utilized for the said purpose.

The safety valve obtained from this invention takes into consideration the previously mentioned need for a safety valve, and the fulfillment of this need is obtained with the help of the features which are given in the following main claim and the subordinate claim.

An embodiment example will be described in greater detail in what follows, and reference will be made to the drawings wherein:

FIG. 3 shows the safety valve seen from above in the same position as in FIG. 1.

Figure 1:
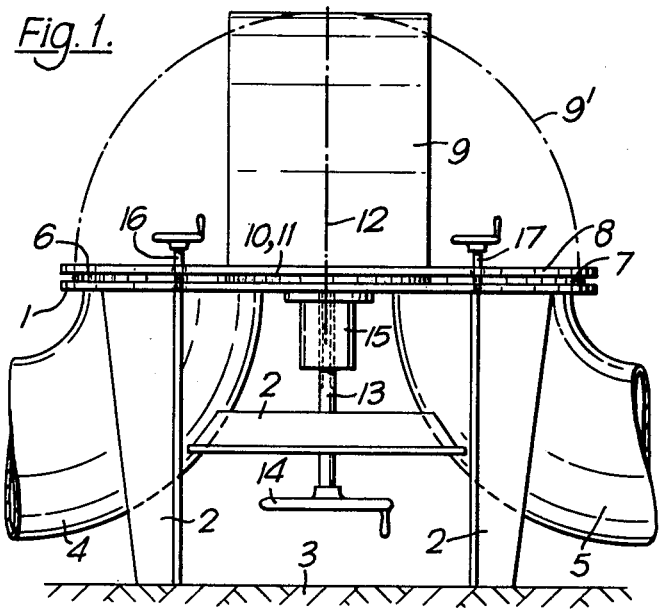
FIG. 1 shows a safety valve seen from the side in the closed i.e. the cut-off position.

The safety valve as shown in FIG. 1 comprises a lower plate 1 mounted on a stand 2, on a ship's deck 3. Attached to a plate 1, which is preferably approximately circular as shown in FIG. 3, are two downward projecting pipe connections 4 and 5 which are connected to the pipe line (not shown) which runs between the inert gas plant and a manifold system equipped with valves for the distribution of inert gas to the ship's tanks. Pipe connections 4 and 5 terminate in openings in plate 1, which openings are made of sealing means as for example gaskets 6 and 7. A plate 8 is rotatably assembled over plate 1 whereupon is fastened a 180° pipe bend 9 whose ends terminate in openings in plate 8, which openings are aligned with the openings 4 and 5 of the pipe connections in the lower fixed plate 1 when the rotatable plate 8 with the pipe bend 9 is rotated to an open position for the safety valve as suggested by the dotted line 9' in FIG. 1; and in which position the pipe bend 9 joins pipe connections 4 and 5 so that the pipe line between the inert gas plant and the tanks' manifold is completed. On this fixed plate 1 are also placed two gaskets 10 and 11 angularly displaced at 90° to gaskets 6 and 7. Plate 8, and with it pipe bend 9 which is rotatably made in relation to plate 1 on a rotating axis 12, are rotatably suspended on the end of a spindle 13 equipped with a hand wheel 14 whose threaded parts work together with a threaded bush 15 fixed to the underside of plate 1. The upper plate 8 is equipped with four screws 16, 17, 18 and 19, assembled at an angular distance of 90° from each other, and furnished with hand wheels, said screws being rotatably suspended in plate 8 and being adapted to work together with the threads provided in holes in the fixed plate 1.

Figure 2:
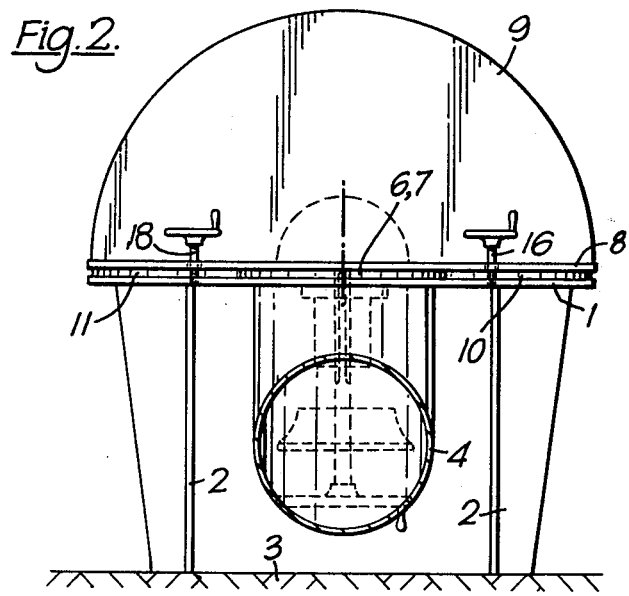
FIG. 2 shows the safety valve seen from the end in the same position as in FIG. 1.

The safety valve shown in the FIGS. 1, 2 and 3 stands closed, or in the cut-off position for the pipe line. The rotatable plate 8 lies against gaskets 6 and 7, and, 10 and 11 on the fixed plate 1, and is pressed so as to be tightly sealed with the help of screws 16–19 which are tightened by means of their respective hand wheels. This operates so that pipe connections 4 and 5 which represent the pipe lines adjoining ends at the cut-off place, are closed with the help of the said gaskets 6 and 7, and the rotatable plate 8. Gas which may possibly leak out from pipe connection 4, which is assumed connected to the tanks, will be vented in the space restricted by plates 1 and 8 and the said gaskets 6, 7, 10 and 11. The said space is shown in FIG. 3 by the numbers 20, 21, 22 and 23. This insures that explosive gas from the tanks will not be drawn back, via the valves and closures in the pipe line, to the inert gas plant where they could possibly ignite and result in an explosion. Simultaneously the openings of pipe bend 9 are closed with the aid of gaskets 10 and 11 together with plate 1, in the same manner as described for pipe connections 4 and 5. This prevents water and possible dust from entering and settling in the pipe bend.

When the safety valve is to be opened, that is to say that pipe connections 4 and 5 will be so joined as to allow the pipe line to lead inert gas from the inert gas plant to the tanks, screws 16 to 19 are unscrewed with the aid of the respective hand wheels so that they are freed from the lower plate 1 together with gaskets 6, 7, 10 and 11. Thereafter plate 8 with pipe bend 9 is lifted from plate 1 with the said gaskets in that the spindle 13 with the aid of the hand wheel 14 is screwed up into the threaded bush 15. When a sufficient clearance has been obtained between plate 8 and the underlying gaskets, plate 8 can be manually rotated 90° to the position indicated by the dotted line 9' in FIG. 1 where the openings for pipe bend 9 end in plate 8 are aligned with the end openings of pipe connections 4 and 5 in the fixed plate 1. Plate 8 with pipe bend 9 is thereafter lowered with the aid of spindle 13 by the opposite rotation of the hand wheel 14 so that plate 8 returns to the assembly against the said gaskets 6, 7, 10 and 11. By further rotating spindle 13 a downward directed pressure can be induced on plate 8 so that it is lying pressed against the said gaskets. The same will naturally apply when the safety valve stands in the previously related closed position. To obtain a better distribution of the tightening pressure between plates 8 and 1 screws 16 to 19 are re-screwed into the corresponding threaded holes in plate 1 whereby the plates are also secured against rotating in relation to each other.

All the above operations can be performed manually by a single person and the safety valve can be operated in a minimal time as opposed, for example, to a spectacle flange valve where the flange after the loosening of the tightening screws must be raised with the aid of a lifting arrangement, turned, and lowered back into position after which the tightening screws must be tightened.

From the safety valve according to this invention is further obtained a rotatable upper part consisting of plate 8 and pipe bend 9, which clearly indicates whether the safety valve stands in the closed or open position. In practise the pipe line between the inert gas plant and the gas tanks' manifold will run along the ship, and the safety valve which can be mounted anywhere in the pipe line via pipe connections 4 and 5 will when in the closed position indicate this by pipe bend 9 standing athwart the ship's length. In the open position the pipe bend will stand parallel to the centre line of the ship, which position is easy to observe from the ship's bridge. In order to further underline the safety valve's position it is possible to paint pipe bend 9 in one or two signal colours. Thus, for example, green can be used on such parts of pipe bend 9 as face the bridge when the safety valve stands in the closed position, and red can be painted on the side surfaces of pipe bend 9 which face the bridge when the safety valve stands in an open position.

Pipe bend 9 can of course be embodied as a U-formed pipe element or as a V-formed pipe element, but the most advantageous form will naturally be the pipe element bowed at 180° which will have the least flow resistance for the inert gas which is to be transported through the safety valve in its open position.

Having described my invention, I claim:

1. A safety valve for use on board tankers for simultaneously cutting off a gas pipe and closing the ends of said pipe to prevent gas leakage therefrom, comprising in combination:
    a lower fixed plate mounted on the tanker's deck;
    a first pair of openings in said fixed plate;
    two main pipe lines permanently connected to said openings in said fixed plate;
    an upper movable plate rotatably mounted on an axis extending at right angles to said fixed plate;
    a second pair of openings in said movable plate;
    a 180° pipe bend mounted on said movable plate and terminating in said second pair of openings;
    four gaskets respectively arranged around each of said openings in said fixed plate and midway between said openings to create a space between said fixed and movable plates;
    means for raising the movable plate on its axis in relation to the fixed plate so that the movable plate can be rotated from an open position where the openings in the fixed plate are aligned with the openings in the movable plate to a cut-off position where the openings in the movable plate are displaced with respect to the openings in the fixed plate and the movable plate seals the openings in the fixed plate.

2. A safety valve as specified in claim 1, comprising four hand operated screws mounted on the movable plate at an angular distance of 90° from each other and adapted to cooperate with threaded holes in the fixed plate so that the movable plate can be tightly pressed against the gasket on the fixed plate.

3. A safety valve for use on board tankers for simultaneously cutting off a gas pipe and closing the ends of said pipe to prevent gas leakage therefrom, comprising in combination:
    a lower fixed plate mounted on the tanker's deck;
    a first pair of openings in said fixed plate; two main pipe lines permanently connected to said openings in said fixed plate;

an upper movable plate rotatably mounted on an axis extending at right angles to said fixed plate;
a second pair of openings in said movable plate;
a 180° pipe bend mounted on said movable plate and terminating in said second pair of openings;
sealing means arranged around each of said openings in said fixed plate and between said openings to create a space between said fixed and movable plates for venting leaking gases;
means for raising the movable plate on its axis in relation to the fixed plate so that the movable plate can be rotated from an open position where the openings in the movable plate are aligned with the openings in the fixed plate to a cutoff position where the openings in the movable plate are displaced with respect to the openings in the fixed plate and the movable plate seals the openings in the fixed plate.

4. A safety valve as specified in claim 3, comprising four hand operated screws mounted on the movable plate and adapted to cooperate with threaded holes in the fixed place so that the movable plate can be tightly pressed against the sealing means.

* * * * *